US008620529B2

(12) United States Patent
Faruque et al.

(10) Patent No.: US 8,620,529 B2
(45) Date of Patent: Dec. 31, 2013

(54) SUB-FRAME DETACHMENT THROUGH EXPLODING BOLTS

(75) Inventors: Mohammed Omar Faruque, Ann Arbor, MI (US); Srinivasan Sundararajan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 13/415,869

(22) Filed: Mar. 9, 2012

(65) Prior Publication Data

US 2013/0238197 A1    Sep. 12, 2013

(51) Int. Cl.
*B60R 22/00* (2006.01)

(52) U.S. Cl.
USPC .......................................................... 701/45

(58) Field of Classification Search
None
See application file for complete search history.

(56) References Cited

U.S. PATENT DOCUMENTS

| 7,434,840 B2 * | 10/2008 | Manwaring et al. | 280/777 |
| 7,987,789 B2 * | 8/2011 | Regebro et al. | 102/476 |
| 2004/0164538 A1 * | 8/2004 | Li et al. | 280/777 |
| 2005/0263996 A1 * | 12/2005 | Manwaring et al. | 280/775 |

* cited by examiner

*Primary Examiner* — Thomas Tarcza
*Assistant Examiner* — Adam Alharbi
(74) *Attorney, Agent, or Firm* — Joseph E. Root

(57) ABSTRACT

A sub-frame in a vehicle includes a sensor, which is configured to sense an occurrence of a vehicular crash. By being connected to the sensor, a controller is adapted to receive a signal from the sensor. The controller further functions to process the signal and provide an output to at least one fastener, the fastener configured to fasten the sub-frame to the vehicle's underbody. The fastener includes at least one chamber filled with an explosive charge, where the explosive charge is configured to explode and detach the sub-frame from the vehicle's underbody, upon receiving the output.

19 Claims, 4 Drawing Sheets

SUB-FRAME DETACHMENT THROUGH EXPLODING BOLTS

BACKGROUND

This application generally relates to the field of improving passenger safety in the event of a front end collision, and, more particularly, relates to achieving an improved crash pulse through the detachment of a vehicular sub-frame.

Crash severities, during front-end collisions in vehicles, are observed to increase as the length of a front end, primarily including the hood, decreases. Most vehicle owners and manufacturers desire for a shorter front-end in modern vehicular design. Crash severities, however, for such vehicles, maintaining a conventional design, may generally be very high, and expensive safety and restraint systems may not prove sufficient to provide adequate protection to vehicular occupants. Particularly, a short front-end, in conventional designs, provides limited advantage to abide by federally mandated occupant safety requirements.

Detachable sub-frames have thus been developed in conventional vehicle safety systems to overcome the disadvantages of short front-ends. During a frontal collision, such detachments, as noted, aim to provide an improved crash pulse by utilizing additional crush space available under a vehicle. Construction of such a sub-frame includes a bolt, or a series of bolts, that fastens a rear portion of a sub-frame to an underbody of a vehicle. During collisions, the bolts are designed to break according to a predetermined threshold, allowing the rear of the sub-frame to unfasten and slide under the vehicle's underbody. Such sliding allows optimal space utilization, and the attainment of a more effective crash pulse, mitigating the transfer of the collision's shock to the vehicular occupants.

In real life accidents, however, a vehicle's loading conditions may vary, which causes the bolts to break at an inappropriate time, causing an improper restraint response in a dangerous collision. In addition, breaking of such bolts also depend upon the bolts' diameter, failure strength at which they are designed, operating temperatures, etc. Such limitations in conventional designs may thus result in an increased possibility of injuries to the vehicle's occupants.

An alternate method and system is thus proposed in the present disclosure, which includes a change in the design and working of the fasteners applied in sub-frames employed in conventional vehicles. Such method and system, particularly aims to achieve a more effective crash pulse deployment in vehicles during a crash.

SUMMARY

One embodiment of the present disclosure includes a sub-frame in a vehicle that includes a sensor, the sensor configured to sense an occurrence of a vehicular crash. A controller, connected to the sensor, receives a signal from the sensor and processes the signal, providing an output to at least one fastener. The fastener is configured to fasten the sub-frame to the vehicle's underbody and includes a structural member. More particularly, the structural member, having two ends, includes at least one chamber filled with an explosive charge, where the explosive charge is configured to explode and detach the sub-frame from the vehicle's underbody, upon receiving the output.

Another embodiment of the present disclosure describes a system for improving a crash pulse in a vehicle, during a crash. The system includes a crash sensor, configured to sense a crash pulse in a vehicle, with a controller connected to the crash sensor, configured to receive a crash signal from the crash sensor. Further, the signal is configured to be processed through an algorithm installed within a memory. Particularly, post processing, the controller is adapted to provide an output to at least one fastener, the fastener being configured to fasten a sub-frame to an underbody of the vehicle. In addition, the fastener includes at least one chamber filled with an explosive charge. The explosive charge, as noted, is configured to explode and detach the sub-frame from the vehicle's underbody, upon receiving the output.

Certain embodiments of the present disclosure describes a method of improving a crash pulse in a vehicle, during a crash. The method includes sensing a crash pulse through a sensor and transmitting a crash signal, obtained through the sensor to a controller. The controller, including an algorithm, processes the crash signal through an algorithm, and provides an output. Post processing, transmitting the output obtained from the controller to a fastener, is carried out, wherein the fastener is configured to fasten a sub-frame to an underbody of the vehicle. Subsequently, exploding the fastener by providing the output to an explosive charge, stored within a chamber in the fastener, detaches the sub-frame from the vehicle's underbody, aiming to achieve an improved crash pulse.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

FIG. 6A illustrates an application of the two-way bolt in an exploding state in a conventional vehicular front-end assembly.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and systems to enable a vehicle's sub-frame to detach from the vehicle's underbody, allowing the vehicle's front-end to attain an improved crash pulse, during a frontal collision. To this end, two-way exploding bolts fasten a rear-end of the sub-frame to a vehicular underbody, and are configured to explode during a collision, enabling a detachment of the sub-frame. Such an explosion is enabled through a sequence of sensing a vehicular crash through a sensor, processing a consequent crash signal through a controller, and transmitting the processed signal to an explosive charge stored within a charge chamber in the bolt, igniting the charge and eventually exploding the bolt.

Exemplary Embodiments

Figure 1A:
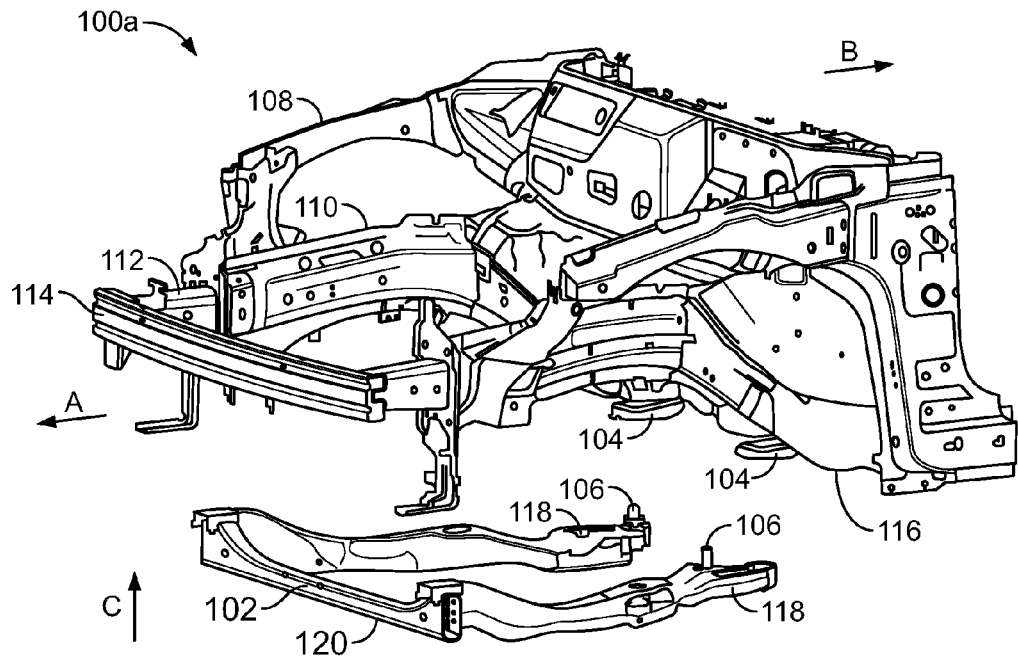
FIG. 1A illustrates a vehicular sub-frame before being assembled in relation to a vehicular front-end.

FIG. 1A schematically depicts a conventional vehicular front-end 100a with one unassembled component, referred to as a sub-frame 102. The vehicular front-end 100a further includes a number of other components namely, a shotgun, referred to as an upper rail 108, and a main rail 110, which accommodates the vehicle's wheels. More so, a crush can 112, which is configured to crush during a frontal collision, and absorb a considerable portion of a consequent shock, forms part of a vehicular crumple zone, and is disposed within the front-end 100a as well. A front bumper 114 forms a skeletal structure for an outer bumper (not shown), providing protection to vehicular components disposed at the front, such as a vehicular grill, headlights, etc., from at least a 3 mph collision, as known conventionally. Further, an arrow A in the figure represents a forward portion of the vehicle, while an arrow B represents a rearward portion of the vehicle, which includes the vehicle's cabin and boot. The components and parts, as mentioned, are well known to those skilled in the art and thus will not be discussed further in the disclosure.

In particular, the sub-frame 102 includes an attachment feature, enabled to attach the sub-frame's rear-end 118 to the underbody 116 of the vehicle, while the sub-frame's frontal part 120 attaches itself to front brackets disposed under the bumper 114 (not shown). The attachment of the frontal part, as stated, includes a known technique, well applied in the art, and has thus not been described further in the disclosure. The attachment of the rear-end 118, however, being the subject of the present disclosure, is described further.

Figure 1B:
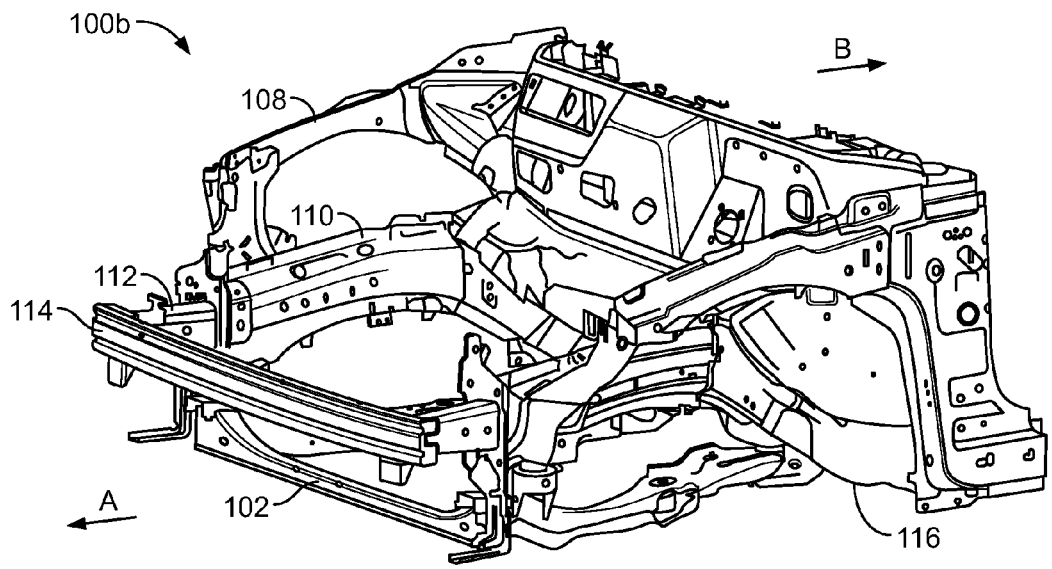
FIG. 1B illustrates the sub-frame assembled to the vehicular front-end.

Conventionally, the sub-frame 102 is assembled to a vehicular underbody 116 in the upward direction, as shown through the arrow C. Assembly at the rear-end 118 includes multiple portions that enable a secure attachment of the sub-frame 102 to the vehicular underbody 116. Such portions, accordingly, include a set of sub-frame mounting bolts 106, which are disposed as shown. The bolts 106 are further configured to mount the sub-frame 102 to the vehicle's underbody 116 through a set of underbody brackets 104, as depicted. FIG. 1B accordingly illustrates a fully assembled front-end 100b of the vehicle, and as stated, the assembly is performed by moving the sub-frame 102 in the direction of the arrow C, as shown in FIG. 1A.

In current practice, the mounting bolts 106, as mentioned, are configured to include a feature to break upon an occurrence of a frontal collision. Such breakage aims to develop an improved crash pulse as a collision advances through the front-end 100a. More particularly, the bolts 106 are designed in such a manner that they break upon the frontal collision exceeding a predetermined crash severity value.

Certain manufacturers and applications utilize an explosive charge in the bolts, 106 for example, pyrotechnic fasteners, used in varied applications such as space missions, etc. Such bolts, configured to fasten one component to another, particularly include a mechanism to ignite a charge, wherein the charge is configured to be stored within a chamber in the bolts 106. Upon an ignition, the charge explodes and allows the fastening to break open, and release the two components in relation to each other. Further, such bolts are typically scored around their circumference at the point where the breakage is configured to occur.

Figure 2:
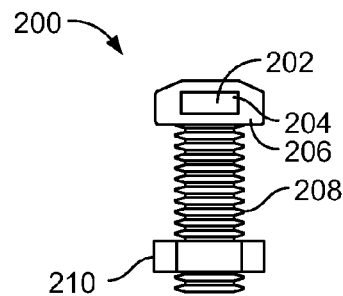
FIG. 2 depicts a conventionally applied exploding bolt in a stable state with an explosion chamber configured in the bolt head.

An embodiment of a conventionally applied exploding bolt is depicted in FIG. 2, and the figure accordingly illustrates a bolt 200, comprised of a structural member. As noted, the structural member includes a bolt head 206 and a thread body 208. In particular, the bolt head 206 includes a chamber 204, having an explosive charge 202 filled and stored therein. While in application, the bolt 200 is configured to include a tightening nut 210 as well. The material employed to manufacture such bolts, or similar fasteners, are generally high strength steel, HSLA350, or higher grade HSLA steels. Moreover, such fasteners are manufactured using known techniques in the art.

A typical explosive charge, such as the charge 202, commonly known as a pyrotechnic mixture, may be comprised of varied compositions. Particularly, such compositions may depend upon the desired burn rate, the required amount of energy and the internal volume of the chamber 204. Further, a typical explosive charge may include a mixture of multiple substances. Accordingly, the mixture can be a manganese-Barium Chromate-Lead Chromate mixture, being applied during gasless burning; RDX-nitrocellulose mixture, where the burn rate is dependent upon pressure maintained within the chamber; Boron-potassium nitrate mixture, where the burn rate is independent of pressure; lead azide, which is sensitive to contact and friction; and Hexanitrostilbene, which is insensitive to stimuli other than explosion.

Figure 3A:
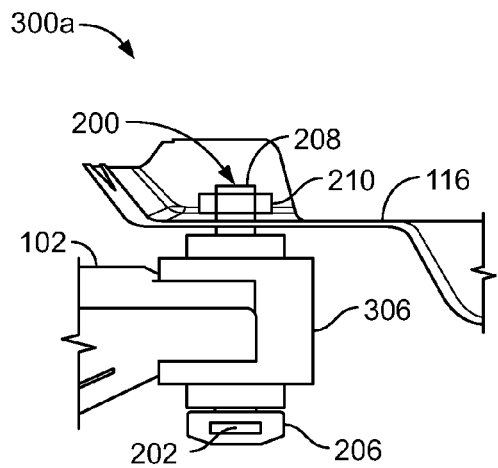
FIG. 3A depicts a conventional application of the exploding bolt in a vehicular assembly.

FIG. 3A depicts an exemplary conventional application of the bolt 200 employed in a vehicular set up 300a, comprising the sub-frame 102 and a vehicular underbody 116. It is understood that vehicular set up 300a, as stated, is similar to the front-end 100a described in FIG. 1A. Further, the vehicular set up 300a includes the bolt 200, employed within the assembly of the two components, namely, the sub-frame 102 and the underbody 116, configured to fasten the two components together at an assembly joint bracket 306. It is understood that the structure and components of the bolt 200 are the same as the ones disclosed in FIG. 2.

Figure 3B:
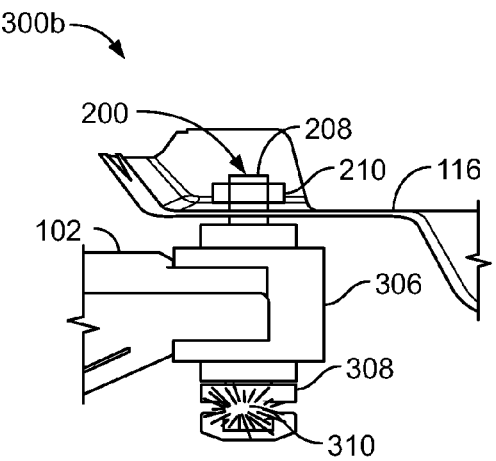
FIG. 3B illustrates the application of the exploding bolt, depicted in FIG. 3A, with the bolt being in an exploding state.

Following FIG. 3A, FIG. 3B depicts an application 300b of the bolt 200 in a state of explosion. Such an explosion 310, as depicted, however, may not function accurately to detach the two components, namely, the sub-frame 102 and the underbody 116, in a desired manner. As illustrated, therefore, a small bolt head portion 308 may remain attached to the thread body 208 as shown, even after a charge ignition and explosion. Unclean breakage, such as the one shown in the figure, thus remains a vulnerability in conventional exploding bolt applications.

Figure 4A:
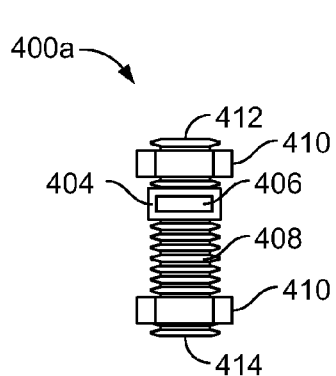
FIG. 4A illustrates a two-way exploding bolt configured with nuts on either ends according to the present disclosure.

To reduce such vulnerabilities, and to counter conditions of unclean breakage, FIG. 4A depicts a two-way exploding bolt 400a, according to the present disclosure. It will be understood that the proposed solution, as depicted in the FIG. 4A, provides a structure similar to the structure of the bolt 200, but reconfigured and modified in certain aspects. Such aspects are described further below.

Accordingly, the two-way exploding bolt 400a includes an elongated structural member having two ends, namely a first end 412 and a second end 414, and having parts and portions similar to the ones disclosed for the bolt 200 in FIG. 2. Further, the two-way exploding bolt 400a includes, a thread body 408, a charge chamber 404, an explosive charge 406, configured to be filled and stored within the charge chamber 404, and tightening nuts, two in number, with each tightening nut 410 disposed respectively at the first end 412 and the second end 414, of the thread body 408, as depicted. As shown in the figure, the charge chamber 404 is configured to be positioned approximately midway to the thread body 408, opposed to the conventionally employed structure, where the charge chamber used to be configured in the bolt head.

Figure 4B:
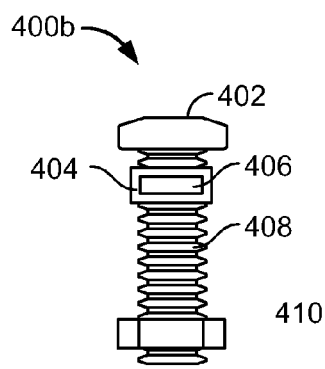
FIG. 4B illustrates a two-way exploding bolt, configured with a bolt head and a nut according to the present disclosure.

More so, FIG. 4B discloses an embodiment 400b of the two-way exploding bolt 400a, as depicted in FIG. 4A. Instead of having two tightening nuts, the embodiment 400b includes a bolt head 402, similar to the one shown in FIG. 2, and a single tightening nut 410, as shown.

In an embodiment, the charge chamber 404 can be configured into a nut, such as the tightening nut 410, enabling an easy attachment and removal of the charge chamber 404 to any conventionally applied bolt.

The configurations and embodiments of the two-way exploding bolt 400a, discussed above, are usage specific, and may vary throughout a range of industrial application. Further, it is understood that the configuration of the two-way exploding bolt 400a enables fastening to components, namely the sub-frame and the underbody, from either of the two ends.

Figure 5:
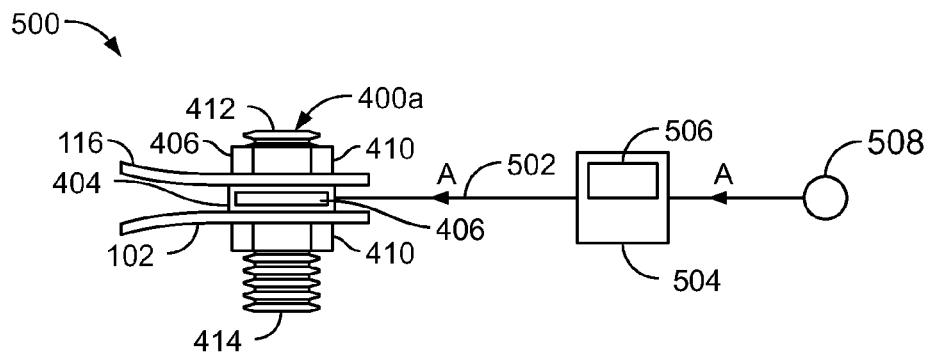
FIG. 5 illustrates an exemplary sub-frame detachment safety system, according to the present disclosure.

FIG. 5 depicts a sub-frame detachment safety system 500 applied in the vehicular front-end 100a, according to the present disclosure. The system 500, employs the two-way exploding bolt 400a, and includes a set of components required to automatically sense, activate, and detach the rear-end 118 of the sub-frame 102 from the vehicular underbody 116, during a frontal collision. Accordingly, a crash sensor 508 is disposed, as shown, and is configured to sense an occurrence of a crash. Further, a controller 504, forming a part of the system 500, is configured to process incoming signals from the crash sensor 508, with all transmission of signals enabled through cabling 502. In particular, cabling 502 enables transfer of crash information right from the crash sensor 508 all the way to the exploding bolt 400a.

The crash sensor 508, as depicted in the figure, configured to sense an occurrence of a crash, or a crash pulse, is positioned generally in the front of a vehicle. Accordingly, the bumper 114, disposed in the front-end 100a, can include slots to accommodate at least one such crash sensor. In addition, the crash sensor 508 can be accelerometers that are industrially applicable, and used for sensing a sudden change in acceleration or velocity of a vehicle, thereby initiating a corresponding signal. Alongside, certain pressure sensors, can also act as crash sensors, and can accordingly be employed in vehicles to sense frontal collisions. Crash sensors, such as the one mentioned above, are configured to produce crash signals according to a sensed collision at the front of the vehicle. An arrow A, illustrated in the figure, depicts the direction of flow of an initiated crash signal. Crash sensors, such as the ones discussed above, are well known in the art and therefore will not be discussed further in the application.

The controller 504, as shown, is configured to receive the crash signal, process the signal, converting the signal into a readable compatible format for further processing. More particularly, the controller 504 housed within an enclosure (not shown), for protection from external forces, applicable particularly during a crash. As is known in conventional applications, the controller 504 may be a microprocessor based device that includes a CPU (not shown), enabled to process the incoming information from a known source. Further, the controller 504 may be incorporated with volatile memory units, such as a RAM and/or ROM, that function along with associated input and output buses. The controller 504 may also be optionally configured as an application specific integrated circuit, or may be formed through other logic devices that are well known to those skilled in the art. More particularly, the controller 504 either may be formed as a portion of an externally applied electronic control unit, or may be configured as a stand-alone entity. One portion of the controller 504 is configured to be connected to the crash sensor 508, while another portion is configured to be connected to the charge chamber 404 in the exploding bolt 400a.

Characteristically, the controller 504 is configured to include a memory 506 within. Particularly, an algorithm configured within the memory 506 is adapted to analyze and process the incoming crash signal, converting the signal from a raw format into a readable format. Such processing, enables a processor, referred to as the CPU, configured within the controller 504, to transfer the consequent processed signals to the explosive charge 406, the explosive charge 406 being stored in the charge chamber 404, and configured to respond according to the fed signal. More particularly, the consequent processed signal being transmitted, and configured to be received by the charge chamber 404, is only transmitted when the controller 504 determines that the crash signal emanating because of a collision exceeds a predetermined severity value. Such a predetermined severity value is configured to be stored within the memory 506, disposed within the controller 504.

The memory 506, in addition, can include volatile and non-volatile storage regions that stores information related to the overall functioning of the safety system 500. Particularly, the memory 506 is configured to record information resulting from a collision and providing the recorded value to the in-built processor. More particularly, a non-volatile region in the memory 506 can be configured to include predetermined crash severity values, algorithms or a software to process incoming signals, maximum and minimum workable temperatures, specifications of the memory 506, controller 504, the exploding bolt 400a, and the exploding bolt, referred to as the embodiment 400b, applied cabling 502, the sensor 508, etc.

In application, the processor configured in the controller 504, is adapted to interact with the memory 506 and convert, calculate, and compute a received crash signal into a readable severity value, referred to as the crash value, and consequently compare the computed crash value to a predetermined crash severity value, stored in the memory 506, as stated above.

The system 500 set out above operates to mitigate a crash severity and improve a crash pulse during a vehicular frontal collision. Accordingly, the operation of the system 500, employing the two-way exploding bolt 400a, as noted above, when applied in-between the two components namely, the sub-frame 102 and vehicular underbody 116, operates as described below.

Figure 6A:
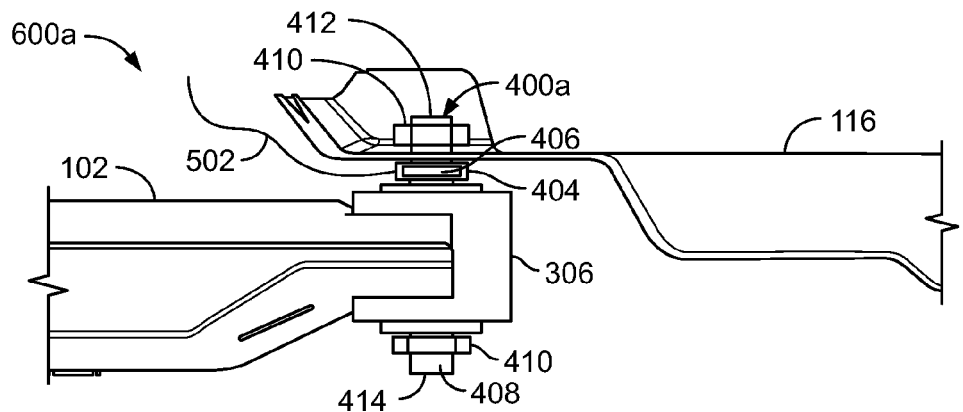
FIG. 6A illustrates an application of the two-way bolt in a conventional vehicular front-end assembly
Figure 6B:
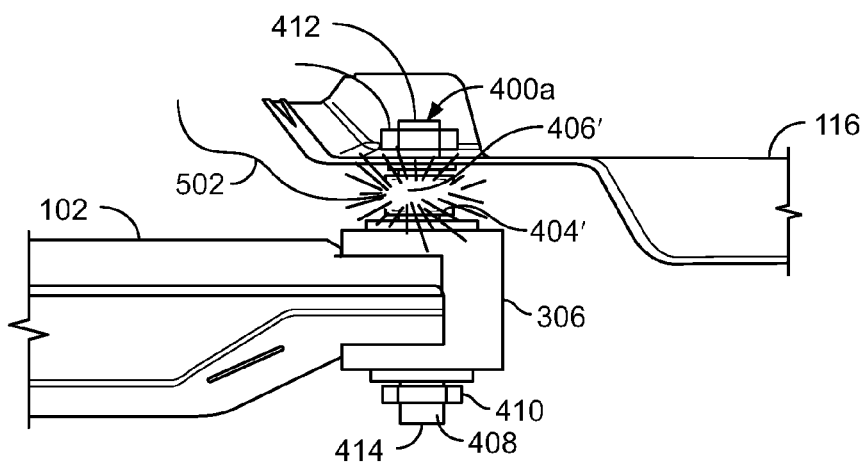

FIG. 6A and FIG. 6B, accordingly, depict a condition in sequence when a crash has occurred in a vehicle employed with the system 500, the vehicle comprising the sub-frame 102 fastened to the underbody 116 through the two-way exploding bolt 400a. Coherently, FIG. 6A depicts a stable condition 600a of the exploding bolt 400a and the sub-frame 102 in relation to the underbody 116 before a crash, while FIG. 6B depicts an exploding state 600b of the exploding bolt 400a during a crash, aiming to improve a crash pulse in the vehicular front-end 100a.

During a collision, the crash sensor 508 senses a collision and a corresponding crash pulse, and generates a consequent crash signal. The crash sensor 508 transmits the generated crash signal, in a direction depicted through the arrow A, the signal being transmitted through the cabling 502, as shown in FIG. 5, and eventually reaching the controller 504. Subsequently, the controller 504, upon receiving the crash signal, processes the crash signal, through the stored algorithm, converting it into a compatible and readable format. Further, the controller 504 enables the processed signal to form a severity value or a crash value as an output, and subsequently, comparing the obtained output to a predetermined crash severity value, stored in the memory 506. If the output obtained is observed to be higher than the predetermined crash severity value, the controller 504 transmits a corresponding output, referred to as an output signal, to the exploding bolt 400a. The output signal, when received by the exploding bolt 400a, and more particularly by the charge chamber 404, ignites the explosive charge 406, stored therein, and explodes the exploding bolt 400a into two or more pieces, enabling a detachment and separation between the sub-frame 102 and the vehicular underbody 116. Consequently, an improved crash pulse is obtained as vacant space within the vehicular front-end 100a is adequately utilized as crushable space, and a shock generated from the collision is thus mitigated through the detachment. An occurrence of an explosion 406' is shown in the FIG. 6B, accompanied with a consequently obliterated charge chamber 404'.

In an embodiment, the severity values of a collision can be recorded and stored in the memory 506, and can be configured to be obtained at later stage, once a crash has occurred. Such recorded values can accordingly allow related analysis on the crash value to be carried out in order to determine and develop better restrain mechanisms, structural reinforcements, etc., applicable in the vehicle during a crash.

Figure 7:
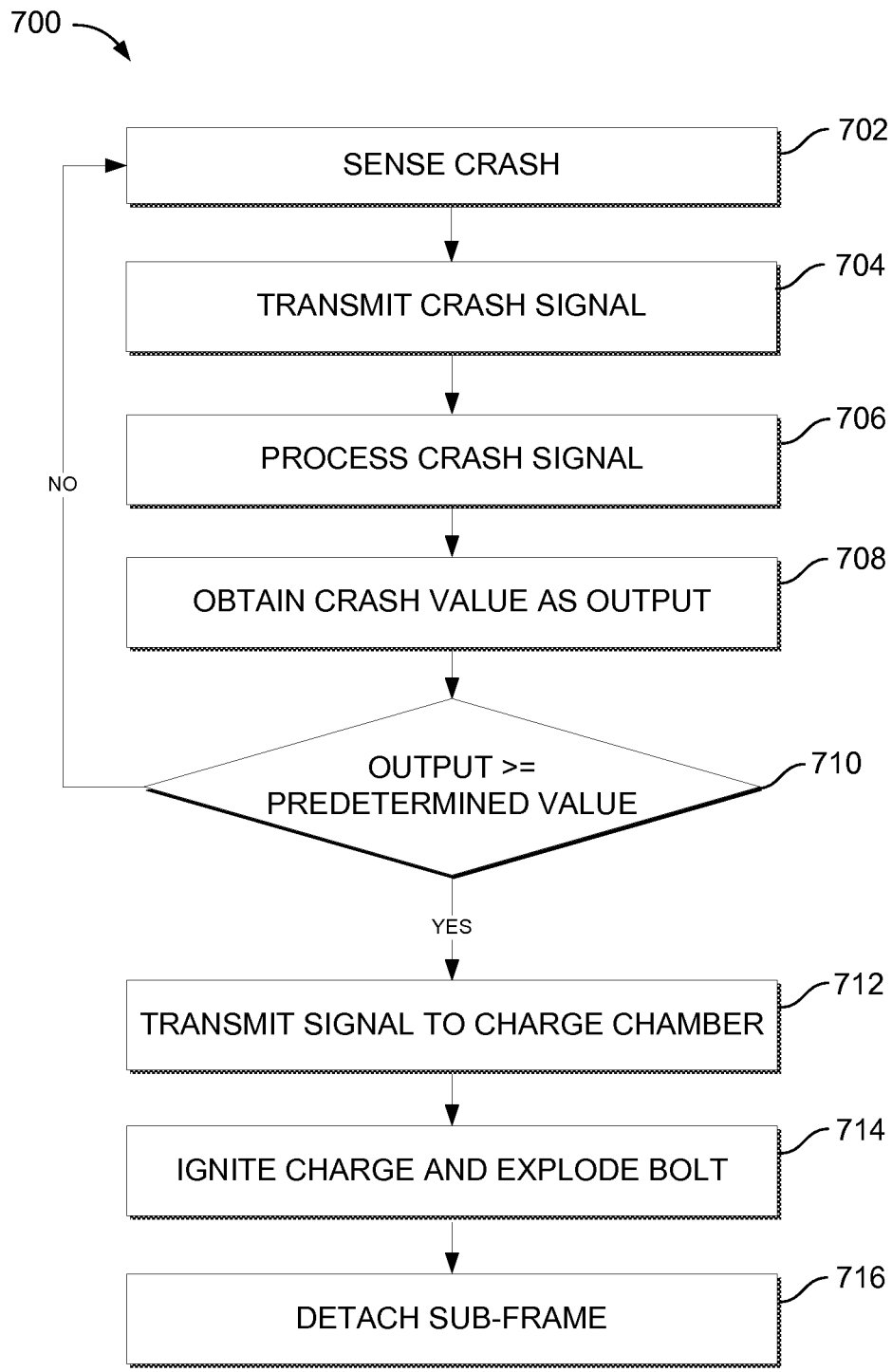
FIG. 7 illustrates a flowchart depicting a method of operation of the sub-frame detachment safety system.

The methodology of the present disclosure is described through a flowchart in FIG. 7. Accordingly, the figure depicts an exemplary method 700 of the system 500, and the description of the flow of operation is thus as follows.

At stage 702, the crash sensor 508 senses an occurrence of a crash at the front of a vehicle. Following the crash, at stage 704, the crash sensor 508 generates a crash signal and transmits the crash signal through the cabling 502 in a direction as shown by the arrow A in FIG. 5. Further, the crash signal reaches the controller 504, the controller 504, receiving the crash signal, includes an algorithm within the memory 506. The algorithm, as stated, processes the incoming signal, and subsequently enables the signal to be converted into a compatible and readable format. The processing and conversion of the signal, as mentioned above, are performed at stage 706.

At stage 708, a processor within the controller 504, obtains a crash value as an output, through the converted signal. The processor functions to compare the output to a predetermined crash severity value, stored within the memory 506, at stage 710. If the comparison obtained results in the output exceeding the predetermined crash severity value, the controller 504 transmits the output to the charge chamber 404 through the cabling 502 at stage 712. Otherwise, the system 500 resets to the first stage 702.

Upon exceeding the predetermined value, the crash signal subsequently reaches the charge chamber 404 at stage 714, igniting and exploding the charge 406, stored within the charge chamber 404. At the final stage 716, the explosion caused, results in a detachment and separation of the sub-frame 102 from the underbody 116, allowing the sub-frame to slide under the underbody 116, and enabling a reduction in the crash severity, by improving the crash pulse.

The system 500 and method 700, discussed above, enables an occurrence of a crash to have minimal affect on occupants within the vehicle by enabling a positive and timely detachment of the sub-frame 102. Further, the system 500 stands advantageous in enabling a detachment of the sub-frame 102 to function by not depending upon the strength of the fastening bolts, that may vary over time, temperature and other conditions, but rather focusses on a timely separation of the sub-frame 102 though an electronically controlled layout.

It will be understood that the method as described above can apply to a rear-end of a vehicle as well, where conventional boot structures may have shorter overhangs, and a structure similar to the sub-frame 102, fastened through fasteners, such as the ones described in the application, requires to be detached to enable an improved crash pulse or propagation.

The specification has set out a number of specific exemplary embodiments, but those skilled in the art will understand that variations in these embodiments will naturally occur in the course of embodying the subject matter of the disclosure in specific implementations and environments. It will further be understood that such variations and others as well, fall within the scope of the disclosure. Neither those possible variations nor the specific examples set above are set out to limit the scope of the disclosure. Rather, the scope of claimed invention is defined solely by the claims set out below.

We claim:

1. A sub-frame in a vehicle comprising:
   a sensor, configured to sense an occurrence of a vehicular crash; and
   a controller, connected to the sensor, the controller configured to receive a signal from the sensor, process the signal, and provide an output to at least one fastener, the fastener configured to fasten the sub-frame to an underbody of the vehicle, the fastener comprising:
      an elongated structural member, the structural member having two ends, and at least one chamber therein about midway between the two ends and filled with an explosive charge, the explosive charge configured to explode and detach the sub-frame from the underbody upon receiving the output.

2. The sub-frame of claim 1, wherein the signal is processed through an algorithm installed within a memory in the controller.

3. The sub-frame of claim 1, wherein the fastener is a two-way exploding bolt.

4. The sub-frame of claim 1, wherein the sensor is a crash sensor.

5. The sub-frame of claim 1, wherein the signal obtained from the sensor is a crash signal.

6. The sub-frame of claim 1, wherein the fastening of the sub-frame to the underbody is enabled through either of the two ends of the structural member.

7. The sub-frame of claim 1, wherein the output obtained through the controller, is received by the fastener, as an output signal, when the vehicular crash is sensed and calculated to have a severity value above a predetermined crash severity value.

8. The sub-frame of claim 7, wherein the severity value is calculated through the controller.

9. A system of improving a crash pulse in a vehicle during a crash, the system comprising:
   a crash sensor, configured to sense the crash pulse in the vehicle;
   a controller, connected to the crash sensor, the controller configured to receive a crash signal from the crash sensor, process the crash signal through an algorithm installed within a memory in the controller, and provide an output to at least one fastener, the fastener configured to fasten a sub-frame to an underbody of the vehicle, the fastener comprising:
      an elongated structural member, the structural member having two ends, and at least one chamber therein about midway between the two ends, and filled with an explosive charge, the explosive charge configured to explode and detach the sub-frame from the underbody upon receiving the output.

10. The system of claim 9, wherein the fastener is a two-way exploding bolt.

11. The system of claim 9, wherein the output obtained through the controller, is received by the fastener when the crash is sensed and calculated to have a severity value above a predetermined crash severity value.

12. The system of claim 11, wherein the severity value is calculated through the controller.

13. The system of claim 9, wherein the fastening of the sub-frame to the underbody is enabled through either of the two ends of the structural member.

14. A method of improving a crash pulse in a vehicle during a crash, the method comprising:
sensing the crash pulse through a sensor;
transmitting a crash signal, obtained through the sensor, to a controller, the controller including an algorithm;
processing the crash signal within the controller, through the algorithm, and providing an output;
transmitting the output obtained from the controller to a fastener, the fastener having two ends configured to fasten a sub-frame to an underbody of the vehicle through either of the two ends;
exploding the fastener by providing the output to an explosive charge, the explosive charge configured to be stored within a chamber about midway between the two ends of the fastener; and
detaching the sub-frame from the underbody.

15. The method of claim 14, wherein the sensor is a crash sensor.

16. The method of claim 14, wherein the transmitting is enabled through cabling.

17. The method of claim 14, wherein the fastener is a two-way exploding bolt.

18. The method of claim 14, wherein the output obtained, through the controller, is received by the fastener when the crash is sensed and calculated to have a severity value above a predetermined crash severity value.

19. The method of claim 18, wherein the severity value is calculated through the controller.

* * * * *